Dec. 24, 1929.   W. R. SHAW   1,740,909
VEHICLE SPOTLIGHT
Filed Feb. 1, 1928   2 Sheets-Sheet 2
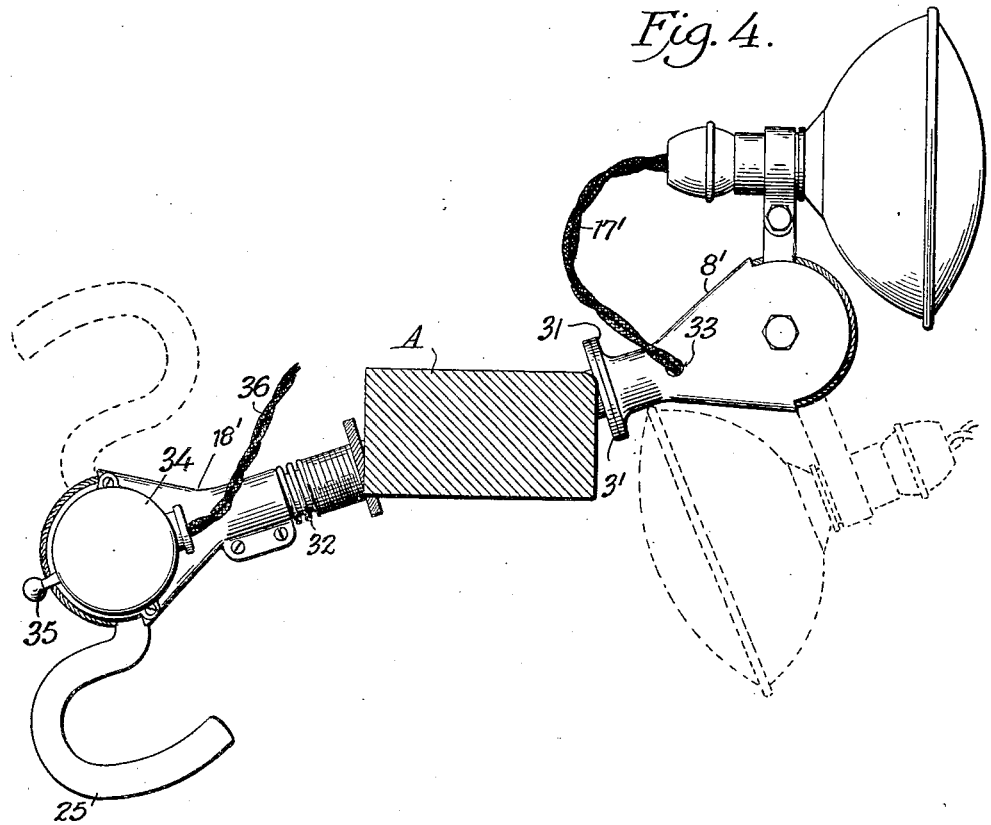
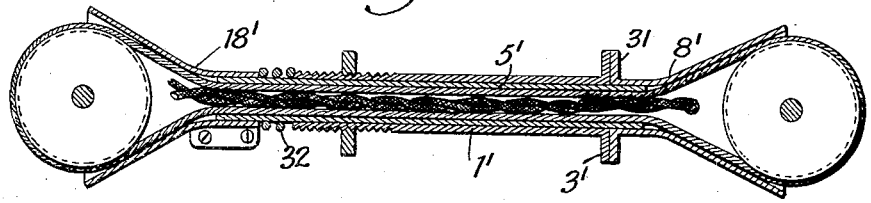
INVENTOR.
William R. Shaw,
BY Lloyd W. Batch
ATTORNEY.

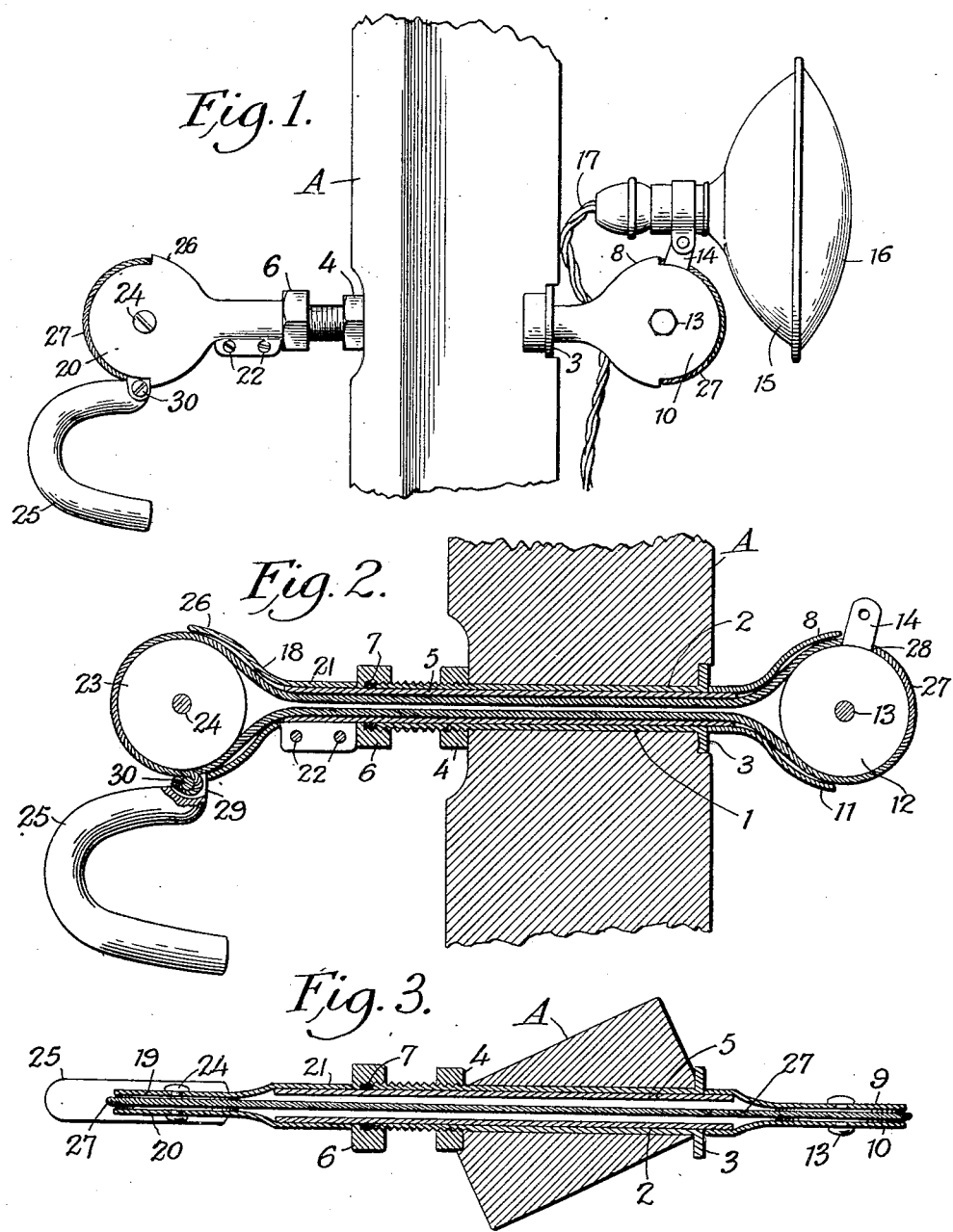

Patented Dec. 24, 1929

1,740,909

UNITED STATES PATENT OFFICE

WILLIAM R. SHAW, OF DENVER, COLORADO

VEHICLE SPOTLIGHT

Application filed February 1, 1928. Serial No. 251,157.

My invention relates to improvements in vehicle spot-lights, and particularly to a dirigible type of spot-light intended to be mounted through the corner post or other similar part of an automobile body and to be controlled from the interior of the car.

An object of this invention is to provide a mounting structure of such character that the spot-light can be mounted through the narrow corner posts now being embodied in closed automobile construction.

Another object resides in so constructing the control and shifting means that a wide range of movement is allowed, thus permitting the rays from the spot-light to be directed over a wide range.

Still another object lies in providing a mounting structure which can be readily installed without the necessity of employing special tubes and without the aid of a particularly trained and skilled mechanic.

Yet another object is to provide means by which the spot-light will be held in adjusted positions to maintain the desired direction of projection of the light rays without shifting of the parts due to vibration and other shocks.

With the above and other objects in view, which will be apparent to those skilled in the art, my invention includes certain novel features of construction and combinations of parts which will be hereinafter set forth in connection with the drawings and then particularly pointed out in the claims.

In the drawings:

Figure 1 is a view in elevation showing a spot-light constructed in accordance with my invention mounted through a post.

Fig. 2 is an enlarged longitudinal sectional view through the mounting.

Fig. 3 is an enlarged sectional view taken at right angles to Fig. 2.

Fig. 4 is a view in elevation showing a modified construction of the spot-light mounting.

Fig. 5 is a longitudinal vertical sectional view through the modified construction.

While my improved spot-light structure might be mounted at various points and upon various portions of a closed automobile or other vehicle, I have found such mounting is readily and conveniently accomplished through the front corner post of the automobile body, and in the present illustration I have shown the structure in each instance mounted through an opening 1 drilled diagonally or otherwise formed through the corner post A. A bearing sleeve 2 having a flange 3 at one end thereof is fitted in this opening 1 and is held rigidly in place by a clamp nut 4. A tubular shaft 5 is revolubly mounted in this bearing 1 and compression nut 6 on the bearing tightens a compressible washer 7 against the tubular shaft 5 to frictionally hold the same in adjusted position.

A bearing housing 8 having disc-like side walls 9 and 10 and a flaring sleeve 11 welded or otherwise secured on the outer end of tubular shaft 5 and a grooved roller 12 is revolubly mounted between the disc-like sides by a bearing pin 13. This roller 12 has an arm 14 extending radially therefrom and a spot-light casing 15 is mounted on this arm 14. The spot-light casing has the usual lens 16 and wires 17 are provided to make circuit connections to the lamp bulb.

A bearing member 18 having disc-like side portions 19 and 20 has a split sleeve portion 21 adapted to fit upon the inner end of the tubular shaft 5 and clamp screws 22 are provided to tighten this split sleeve to mount the bearing 18 in fixed relation upon the tubular shaft. A grooved roller 23 is mounted between the disc-like sides 19 and 20 of the bearing portion 18 upon a bearing pin 24 and an operating handle 25 extends laterally from said grooved roller. Bearing portion 18 has a flaring sleeve 26 merging with split sleeve 21 and enclosing the inner side of roller 23, and flaring sleeve 11 similarly encloses the inner side of roller 12.

A flexible cable 27 is fitted around grooved roller 12 and is secured thereto at 28, adjacent arm 14, by soldering or in any other suitable manner. The ends of the cable are then extended through the flared sleeve 11 and through tubular shaft 5 to come out through flared sleeve 26 on opposite sides of grooved roller 23. An opening is provided at 29 at the base of handle 25 and the ends of the cable inserted through this opening in opposite directions are clamped and held in place by screw 30. As the cable works around the grooved rollers it is confined at each end of the tubular shaft by the flared sleeves 11 and 26, and any frictional contact of the cable is against rounded portions of these flared housings to thus avoid cutting of the cable and excessive friction. Clamp screws 22 can be loosened and bearing portion 18 can be adjusted by sliding split sleeve 21 along the tubular shaft 5 to secure proper adjustment of cable 27 to take up any slack.

With the spot-light constructed and mounted in the manner set forth the light case 15 is disposed on the outer side of the corner post or other supporting member and the operating handle 25 is located on the inside of the vehicle at a point to be conveniently grasped and manipulated by the operator or other occupant of the automobile or vehicle. The handle 25 is swung to move grooved roller 12 around its bearing and consequently swing the light casing 15 around the bearing center at 13, and further adjustment is accomplished by twisting upon the handle to revolve the tubular shaft 5 within the bearing 1. In installing my improved spot-light upon a vehicle the clamp screws 22 and 30 are removed and the ends of the cable 27 are released so that bearing portion 18 can be removed from the end of the tubular shaft 5. Compression nut 6 and clamp nut 4 are then removed and the bearing sleeve 7 can then be readily inserted through opening 2 drilled or otherwise formed through the corner post A. The clamp nut 4 and the compression nut 6 are then again fitted in place and with the ends of cable 27 passing through the flared sleeve 26 on opposite sides of grooved roller 23, the split sleeve 21 of bearing portion 18 is fitted upon the inner end of tubular shaft 5. The ends of the cable are fitted in the opening 29 and screw 30 is inserted to secure the ends of the cable, following which the bearing portion 18 is adjusted to take up any slack in the cable. Clamp screws 22 are tightened to secure the bearing portion 18 in fixed relation upon the tubular shaft 5. Frictional contact between the disc-like sides of the bearing portions 8 and 18 and the respective grooved rollers 12 and 23 will hold adjustments of the roller 12 to maintain the desired position of the lamp case 15 as the same is adjusted in the arced path around bearing 13 and compression nut 6 and compression washer 7 will maintain settings of the spot-light mounting as the tubular shaft 5 is turned within the bearing 1.

With the structure shown in Figs. 4 and 5 the bearing member 8' has a friction flange 31 on its inner end to engage frictionally with the flange 3' on bearing sleeve 1', and the compression nut and compression washer 6 and 7 are omitted at the inner end of this sleeve. A coil spring 32 is fitted around the inner end of tubular shaft 5' between the inner end of bearing 1' and the adjacent end of bearing member 18' to resiliently draw flange 31 against flange 3'.

In this disclosure the electric wires 17' are led through an opening 33 in bearing member 8' and then through the tubular shaft 5' back to an electric switch 34 which is mounted on the bearing member 18'. This electric switch 34 is shown in the present instance as having a toggle switch handle 35, but it will be appreciated that the switch can be of any desired type; and, the electric wire 36 from the switch is led to any suitable battery connection or other source of current supply.

As indicated by the dotted lines in Fig. 4, the lamp case 15 can be adjusted by manipulation of handle 25 to project the light rays forwardly substantially in a line parallel with the tubular shaft, and in an opposite setting backwardly on a line substantially paralleling the axis of the tubular shaft, it being appreciated that the light rays can be projected at any angle intermediate the two extremes. Revoluble movement of the tubular shaft will swing the bearing member 13 to dispose the axis thereof at various angles and it will be appreciated that through the double adjustment thus provided the light case can be set to throw the rays forward at any angle, upwardly, downwardly and laterally through a wide range, and rearwardly along the side of the car or even into the interior of the car. This wide adjustment makes it possible to direct the light rays upon the engine of the automobile on which the installation is made, back into the car, laterally substantially at right angles on either side of the car, to find a house number, and rearwardly as a backing light, as well as at any angle in front of the vehicle.

While I have herein shown and described only certain specific embodiments of my invention, and have suggested only certain possible modifications, it will be appreciated that many other changes and variations can be made in the form, construction, arrangement, assembly and mounting of the parts without departing from the spirit and scope of my invention.

I claim:

1. A vehicle spot-light comprising a bearing sleeve to be mounted through an opening in the upper portion of the vehicle, a tubular shaft revolubly mounted in said bearing sleeve and frictionally held against casual turning, a bearing member fixed on the outer end of said tubular shaft having disc-like sides and a flared sleeve portion merging into the tubular opening of the shaft, a second similar bearing member removably and adjustably fitted on the inner end of said tubular shaft, grooved rollers revolubly mounted between the disc-like sides of each of said bearing members, an arm extending from the grooved roller at the outer end of the shaft, a spot-light casing carried on said arm, a handle extending radially from the grooved roller at the inner end of the shaft, a flexible cable connected in its middle portion with the other grooved roller adjacent the arm thereof and extending through said tubular shaft to have its ends adjacent the grooved roller at the inner end of the shaft, and means to secure the ends of said cable adjacent the handle to work around said second grooved roller.

2. A vehicle spot-light comprising a bearing sleeve to be mounted through an opening in the upper portion of the vehicle, a tubular shaft revolubly mounted in said bearing sleeve and frictionally held against casual turning, a bearing member fixed on the outer end of said tubular shaft having disc-like sides and a flared sleeve portion merging into the tubular opening of the shaft, a second similar bearing member removably and adjustly fitted on the inner end of said tubular shaft, grooved rollers revolubly mounted between the disc-like sides of each of said bearing members, an arm extending from the grooved roller at the outer end of the shaft, a spotlight casing carried on said arm, a handle extending radially from the grooved roller at the inner end of the shaft, a flexible cable connected in its middle portion with the other grooved roller adjacent the arm thereof and extending through said tubular shaft to have its ends adjacent the grooved roller at the inner end of the shaft, means to secure the ends of said cable adjacent the handle to work around said second grooved roller, means to adjust the tension of said cable, and means to maintain the frictional engagement of said bearing sleeve with the tubular shaft.

3. A vehicle spot-light comprising a bearing sleeve to be mounted through a portion of the vehicle, a tubular shaft mounted in said bearing sleeve and frictionally held against casual movement therein, grooved rollers revolubly mounted at opposite ends of said shaft, a spotlight casing carried radially by one of said grooved rollers, a handle extending radially from the second grooved roller, and a cable passing through said tubular shaft fitted upon said grooved rollers and secured thereto adjacent the lamp case and handle mounting respectively to impart movement to the spot-light casing as the handle is manipulated.

In testimony whereof I hereunto affix my signature.

WILLIAM R. SHAW.